UNITED STATES PATENT OFFICE.

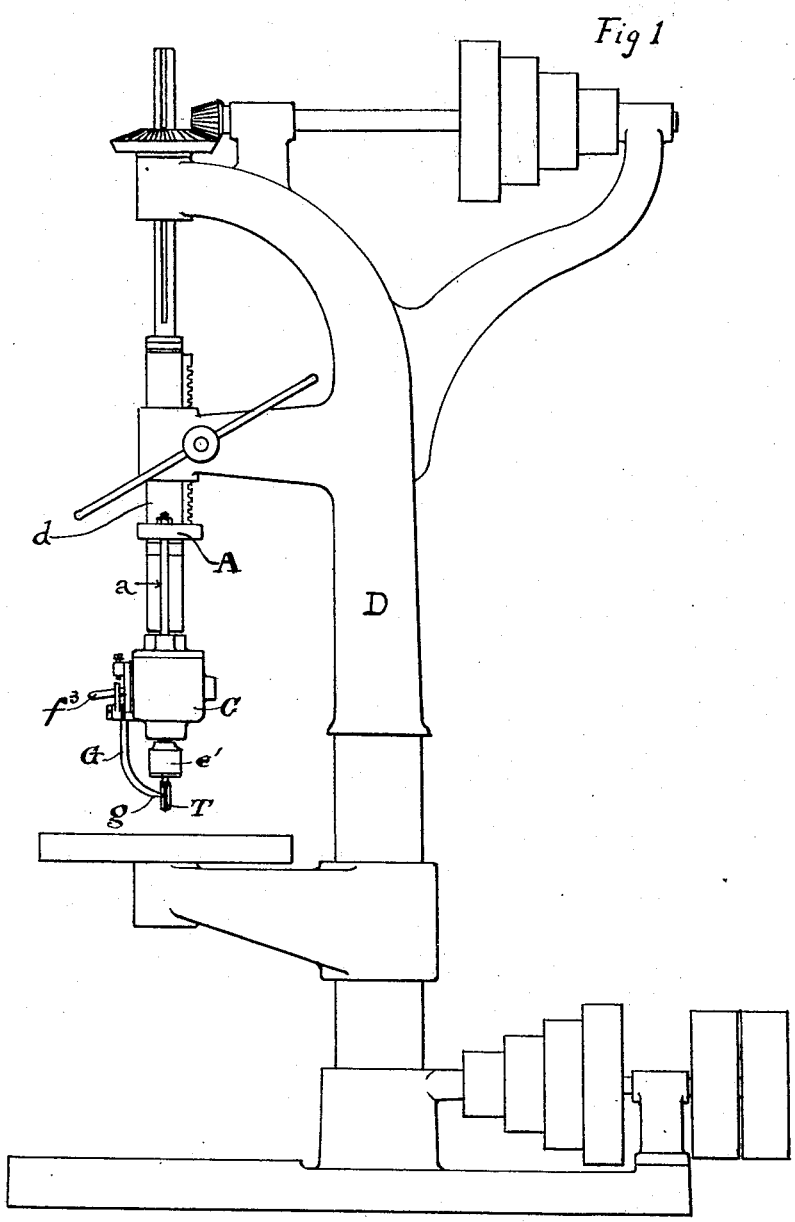

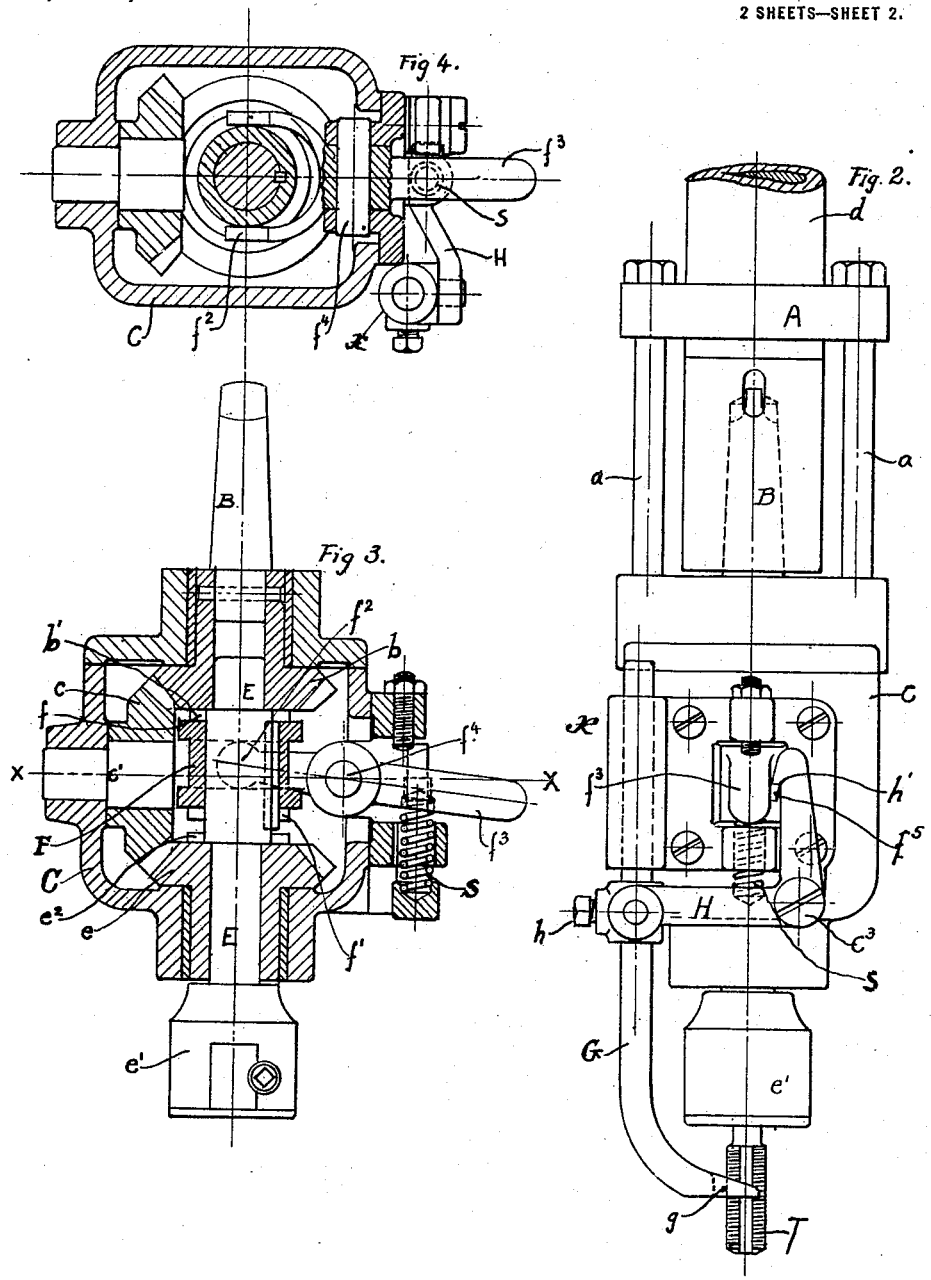

ARTHUR C. PLETZ, OF CINCINNATI, OHIO.

TAPPING OR THREAD-CUTTING DEVICE.

1,213,253.  Specification of Letters Patent.  Patented Jan. 23, 1917.

Application filed July 30, 1915. Serial No. 42,844.

*To all whom it may concern:*

Be it known that I, ARTHUR C. PLETZ, a citizen of the United States, residing at Cincinnati, in the county of Hamilton and State of Ohio, have invented new and useful Improvements in Tapping or Thread-Cutting Devices, of which the following is a specification.

My invention relates to improvements in machines for tapping or cutting threads in holes, and consists of a device to be attached to the revolving spindle of a drill press or other machine tool having a revolving spindle.

In the ordinary tapping machines, the tap is run into the hole to be threaded until the desired depth is reached, then the machine spindle is reversed by hand to withdraw the tap from the threaded hole. Any inattention on the part of the machine operator is liable to run the tap down too far, either breaking the tap or stripping the threads in the hole.

With my improved device, when the tap has been run in to the predetermined depth, the chuck spindle is automatically reversed and the tap backed out of the hole. Such accidents as frequently occur with present devices, are completely avoided.

My invention is illustrated in the accompanying drawings, in which—

Figure 1 is an elevation of my device attached to an ordinary drill press; Fig. 2 is a front elevation of the device, and the lower end of the drill press spindle to which it is fixed; Fig. 3 is a vertical axial section of the device, seen from the side; Fig. 4 is a cross section of the full device on the line $x$—$x$ of Fig. 3.

Referring now to the drawings, D is the drill press of the usual type, and $d'$, the drill-spindle fitted to receive a taper shank of a drill or the like in the usual way.

My improvement is a tapping attachment contained in as upon a casing C suspended by draw-bolts $a$ from and by means of a collar A tightly clamped upon the non rotating sleeve $d^2$ of the drill press, containing the usual rotating spindle. The casing is thus adapted to be drawn upward to seat the taper shank B securely in the socket of the rotating spindle, of which it thus forms a continuation. The shank B enters at its lower end into rigid engagement with the hub of a bevel gear $b$ upwardly extended through the upper wall of the casing as a bearing,—said gear being housed just within the casing and in constant mesh at one side with a corresponding bevel gear $c$, running loosely upon a stud $c^1$ projecting inwardly from the side wall of the casing. The idler $c$ is also in constant mesh below with a third bevel gear $e$ housed just within the casing, with a hub extending in axial alinement with the gear $b$ through the lower wall of the casing as a bearing.

Entering above somewhat into the axial orifice of the upper gear $b$ and extending thence downwardly entirely through the axial orifice of the lower gear $e$, in loose seating as to both, is an independent spindle E, to the lower end of which is attached a chuck or head $e^1$ for operation of a drill or tap. The spindle E is enlarged at the space between the gears $b$ and $e$ forming engaging shoulders holding the gears and itself in proper relations. The centrally enlarged portion of the spindle E carries a vertically splined clutch F by which it is held in constant rotative engagement therewith, with space for vertical movement to engage the said spindle alternately with the gears $b$ or $e$ which are in constant rotation in opposite directions. For the operation of the clutch F (which is of the usual rotating type) a yoke-lever pivoted at $f^4$ with projecting handle $f^3$ for manipulation is provided.

For automatic action a bell-crank trip-lever H is pivoted at $c^3$ with hook projection $h$ at its upper end engaging over a corresponding projection $f^5$ upon the hand lever $f^3$. The horizontal arm of the bell-crank is pivotally engaged with a vertically movable trip rod G, adjustably by a set screw $h$. The trip rod is guided in a suitable extension of the casing and its lower terminal is curved horizontally into a bifurcated foot $g$ adapted to straddle the drill or tap and rest upon the top of the article to be countersunk or tapped; so that as the drill platen (not shown) is raised as the work proceeds, the article worked contacts with and raises the trip rod G and lever-arm H, and throws off the hook engagement of the bell crank at $h^1$. Thus released, the operating yoke $f^3$ is forced upward by a spring S, hitherto held in tension by the described engagement and the clutch instantly thrown to the opposite rotation.

To recapitulate the mode of operation more fully: When the clutch lever is raised set the trip or foot, $g$ at the desired height on the tap T, then tighten the set screw $h$ to hold the trip rod and trip lever in proper operative relation. Grasp the lever $f^3$ and bear down on it until the clutch engages the gear $b$ when the hook $h^1$ will engage the lug $f^5$ holding the lever in that position. It is obvious that a bracket on the drill frame or elsewhere may be provided to engage the lever $f^3$ when the tap is raised. The device is now set for forward motion, and the usual rotation of the drill-spindle will cause the tap to enter and thread the blank, until the trip or foot $g$, engages the work being tapped, when further forward rotation presses the trip rod and contiguous end of the trip-lever H upward, pressing the hook $h^1$ out of engagement with the lug $f^5$, when the spring S forces the outer end of the lever $f^3$ upward, causing the clutch to engage with the gear $e$ which then through the gear train, $b$, $c$, $e$, reverses the rotation of the attachment spindle E, clutch $e^1$ and tap T, and the reverse rotation withdraws the tap. Before tapping each hole, the operator must adjust the hook $h^1$ to the lug $f^5$, but reverse is automatic.

The operation of the device is the same where the drill and tap are combined.

I claim as my invention and desire to secure by Letters Patent of the United States:

1. In a tapping attachment, the combination of means for attaching the tapping device to the sleeve of the drill-spindle, a shank and beveled gear attached thereto, for transmitting the rotation of the drill-spindle, an attachment spindle, and beveled gear attached thereto to transmit reverse motion to the attachment spindle, an idler gear meshing with both the aforesaid gears, a clutch splined to the attachment spindle, and adapted to engage either the first or second mentioned gears, a yoke lever for shifting said clutch, a spring adapted to normally hold said mechanism in reversing motion position, a lug on said yoke lever, a trip rod with a trip adapted to engage the material being tapped when the tap has entered the work a predetermined distance, a trip lever, one end of which is adapted to be fixed to the trip rod, and a hook on the trip lever adapted to engage the yoke lever so as to hold the device in position to insure forward rotation of the tap, until the hook is released from the lug by pressure of the trip on the material being tapped.

2. In a drilling and tapping machine, in combination with the suspended gear casing containing the reversing train of bevel gears, a drill spindle entering said casing from below loosely through the lower gear and into an axial bore or recess of the upper, and having an enlargement between the upper and lower gears spacing said gears apart.

3. In a drill press attachment of the character indicated in combination with the independent drill spindle, the oppositely rotating bevel gears and clutch mechanism for rotatively connecting the spindle with the gears alternately, a spring bearing mediately against the clutch to hold the engagement normally in reverse or withdrawal movement of the drill or tap; a movable locking catch holding the spring in compression; and a trip rod connected therewith and adapted to operate the release when the required depth of penetration is reached by the drill in the article worked.

4. In an attachment of the character described, the combination with the drill spindle and its rotative mechanism and shifting clutch, of an operating yoke, having a hand lever provided with a projection, a bell-crank lever pivoted at its angle having one end provided with a catch adapted to engage said projection, and a trip-rod adjustably connected to another arm of the bell-crank lever and adapted to release the engagement of the catch with said projection.

In testimony whereof I have hereunto set my hand in presence of two subscribing witnesses.

ARTHUR C. PLETZ.

Witnesses:
 WALTER A. KNIGHT,
 LEWIS M. HOSEA.

Copies of this patent may be obtained for five cents each, by addressing the "Commissioner of Patents, Washington, D. C."